United States Patent [19]

Sheppard

[11] 3,942,412
[45] Mar. 9, 1976

[54] FLUID CONTROL SYSTEM FOR DUAL POWER STEERING

[76] Inventor: Richard H. Sheppard, c/o R. H. Sheppard Co., Inc., Hanover, Pa. 17331

[22] Filed: Nov. 1, 1974

[21] Appl. No.: 520,160

[52] U.S. Cl............. 91/411 R; 60/456; 180/79.2 R
[51] Int. Cl.² ........................................... F15B 7/00
[58] Field of Search ............... 180/79.2 R, 79.2 B; 60/456, 484; 91/411 R

[56] References Cited
UNITED STATES PATENTS
| | | | |
|---|---|---|---|
| 2,614,644 | 10/1952 | Gustafson | 180/79.2 B |
| 3,092,083 | 6/1963 | Sheppard | 180/79.2 R |

Primary Examiner—Philip Goodman
Assistant Examiner—John A. Pekar
Attorney, Agent, or Firm—Lowe, King & Price

[57] ABSTRACT

A fluid control system for master-slave power steering combinations includes master and slave steering units, a pump, a low pressure discharge line from the master unit, a low pressure transfer space in the slave unit and a low pressure return line to the pump. The transfer space receives heated, low pressure exhaust fluid through the discharge line from the exhaust chamber or space of the master unit. The fluid return line is connected to the transfer space of the slave unit to feed the intake side of the pump. Build-up of pressure in the slave unit is prevented. Secondly, the fluid circulated through the transfer space of the slave unit transfers heat generated in the pump and the master unit. The temperature gradient between the master and slave unit is thereby minimized to effect cooling or heating in the system, as needed. Further, build-up or accumulation of air bubbles in the slave unit is alleviated. The steering units are preferably integral steering gears with the discharge means of the master unit and the transfer space of the slave unit including the space that encloses the output pinion. Single fluid transfer hoses interconnect the power chambers of the steering units. The piston of the slave unit is hollow with plugs closing the ends.

6 Claims, 2 Drawing Figures

FLUID CONTROL SYSTEM FOR DUAL POWER STEERING

FIELD OF THE INVENTION

The present invention relates to dual power steering systems, and more particularly, to a fluid control circuit for a dual system.

BACKGROUND OF THE INVENTION

It has become increasingly popular in the truck and off-the-road vehicle field to use multiple power steering units. This need has arisen due to the substantial increase in capacity of these vehicles in recent times. The tires of the vehicles are larger and the heavier weight contributes to the additional power needed to comfortably steer a truck or similar vehicle.

Another factor that has affected going to multiple power units, usually dual power units, has been the desirability of keeping the units to a reasonable size and capacity. The space requirements under a truck have always been critical and the linkage running from the power unit to the wheels is more economically designed if the power is distributed at least adjacent the two front wheels.

The truck owner today has a choice of providing the dual power steering units with double or completely separate fluid supply circuits, or a single supply circuit. In a dual supply system, there is complete redundancy; i.e., the system includes two separate pumps, valves and sets of transfer hoses. If one system fails, the other system is provided as a complete independent back-up system. For safety's sake, this dual system is desirable and may be required by government regulation in the near future.

In a dual supply system, the separate control valves for the two power units are usually mounted in or on one of the units, which is called the master gear. The unit that is exclusive of a valve, but is controlled by the valve on the master unit, is referred to as the slave power unit.

In the simplified single supply circuit, there is only one valve and one pump with the slave unit being supplied directly from the cylinder of the master unit.

In designing a slave power unit for single circuit systems, it is most desirable to have single fluid transfer means connecting each of the power chambers. This allows alternate introduction of high pressure working fluid on one side of the piston for power and concurrent exhausting on the other side of the piston. No separate returns for the low pressure fluid are provided. However, when this is done, a problem arises in that the space enclosing the output gear of the slave power steering unit is susceptible to the build-up of pressure. This results from minor leakage around the sealing rings of the piston. Since it is highly desirable to have the output shaft of the unit sealed only by a low pressure seal, there must be provided a means for bleeding this space or any other similar space within the slave unit.

In my previous patent, entitled "Power Steering Gear Assembly", U.S. Pat. No. 3,822,759, issued July 9, 1974, I provide a slave gear assembly modification that solves the problem. In this previous patent, the high pressure fluid trapped in the space is bled during each power stroke to the exhaust side of the piston through check valve means. The patented system works satisfactorily with either single or double control circuits and has gained acceptance in the field.

Even though the modified structure of the slave gear of the previous patent had no particular shortcomings and does solve the pressure build-up problem, it was natural to seek different, possibly better ways of accomplishing this function in a master-slave combination. It occurred to me that this better way could be by modification of the fluid circuit, either the conventional, single power supply circuit or the more recent double power supply system. The modification of the control system would be in lieu of the modification of the slave-gear unit structure, and thus the slave unit of my new arrangement would not require the check valves at the ends of the piston.

OBJECTIVES OF THE INVENTION

It is thus one object of the present invention to provide a new fluid control circuit that prevents build-up of pressure in the slave gear unit.

It is another object of the present invention to provide a fluid control circuit for a dual power steering system of the type described wherein attendant advantages of (1) minimizing the temperature gradient between the master and the slave unit and (2) continual purging of air bubbles from the system, are provided.

BRIEF DESCRIPTION OF THE INVENTION

According to the invention of the present application, a fluid control circuit for a dual power steering system is provided wherein exhaust fluid from the master unit is circulated through a transfer space in the slave unit. The primary purpose of this fluid circulation is to prevent the build-up of pressure due to inevitable leakage around the sealing rings of the operating piston. Desirable heat transfer and air bubble purging are important secondary advantages, as will be explained later.

In the inventive system, pump means, which can either be single or double pumps (one for each unit), provide high pressure fluid to the power units. The exhaust from the master unit is fed by fluid return means through the transfer space of the slave unit. As the low pressure fluid moves through, it entrains any fluid that has leaked around the piston, and the low pressure is thus maintained. In the preferred embodiment shown, after the exhaust fluid from the master unit is circulated through the transfer space of the slave unit, it is returned through fluid return means directly to the intake side of the single pump.

Of particular importance to the present invention are the secondary advantages. First, the circulation of the discharge fluid from the exhaust side of the master unit through the slave unit brings the slave unit up to a temperature approximating that of the master unit. This is important since, with the slave unit in effect becoming a heat sink, the temperature gradient between the master and the slave unit is minimized, or effectively eliminated. Under severe steering conditions, the working fluid in the master unit would become very hot and circulation through the slave unit provides a body through which the oil may be effectively cooled. In cold weather, when the vehicle has just been started, the circulation of fluid through the slave unit warms the unit providing smoother and more efficient operation.

Secondly, the circulation of fluid through the slave unit provides an effective way to bleed or purge the unit of any air bubbles that might become entrapped in the system. This problem is particularly acute in the type of dual systems described above. The limited back and forth movement of hydraulic fluid trapped in the single fluid transfer hoses between the working chambers of the two units makes if difficult for the air to work itself to the exhaust side of the pump where it can escape to the atmosphere. Trapped air can cause erratic movement of the slave unit, a loss of synchronization between the units and thus undesirable chattering of the units as they fight against each other. In the present invention the fluid flowing through the transfer space entrains the bubbles in the hydraulic fluid, returns the fluid and the bubbles to the intake of the pump and the bubbles can escape.

Preferably, the piston for the slave unit is a piston that has been bored out so that the metal may be more effectively heat trated for hardening of the metal. In fact, the piston may (for economic reasons) be just like the piston for the master unit, but without the internal control valve. The ends of the piston are closed by solid plugs to prevent direct flow of fluid between the power chambers of the slave unit and the low pressure transfer space.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

DETAILED DESCRIPTION OF THE PRESENT INVENTION

Figure 1:
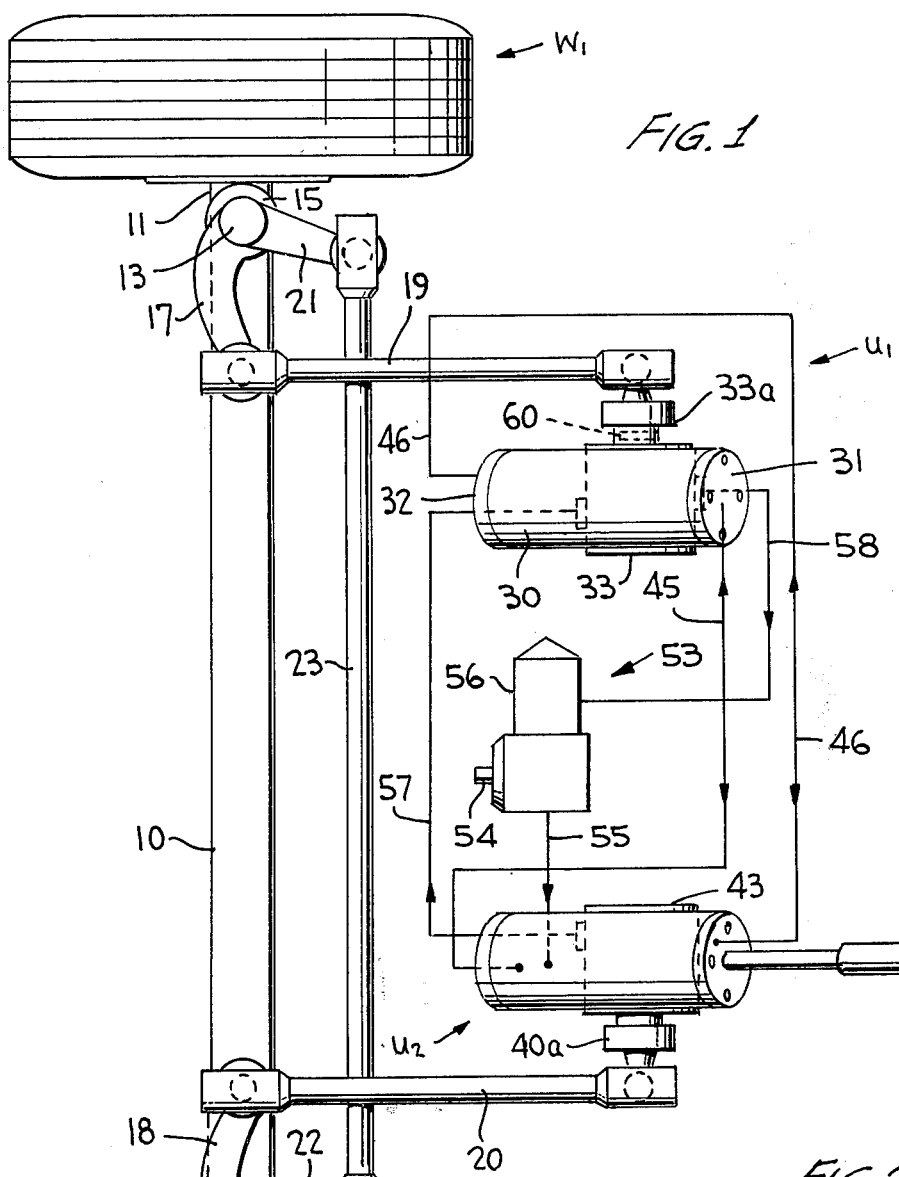
FIG. 1 is a schematic view showing the dual power steering system of the present invention with the fluid control circuit including the inventive principles.

In FIG. 1, a schematic form of a dual power steering system is shown to illustrate the principles of the present invention. Wheels $W_1$, $W_2$ are provided on a vehicle (not shown) with the wheels being supported on a conventional cross axle 10. The wheels $W_1$, $W_2$ are suitably mounted on respective spindles 11, 12 to accommodate pivoting action for steering on pivot pins 13, 14. The pins are held in sockets 15, 16 formed in the ends of the axle 10.

Fixed to the pivot pins 13, 14 are corresponding steering arms 17, 18 connected to respective drag links 19, 20. Crank arms 21, 22 also fixed on the pivot pins 13, 14, respectively, are interconnected by a conventional tie rod 23 that assures synchronization and thus proper turning and alignment of the wheels $W_1$, $W_2$. As shown, the physical interconnection of the drag links 19, 20 and the tie rod 23 are made by ball and socket joints to permit the necessary angular and rotative movement.

The drag links 19, 20 are operated by two steering subsystems. The first subsystem includes a slave steering unit $U_1$ and the second subsystem includes a master steering gear unit $U_2$.

Figure 2:
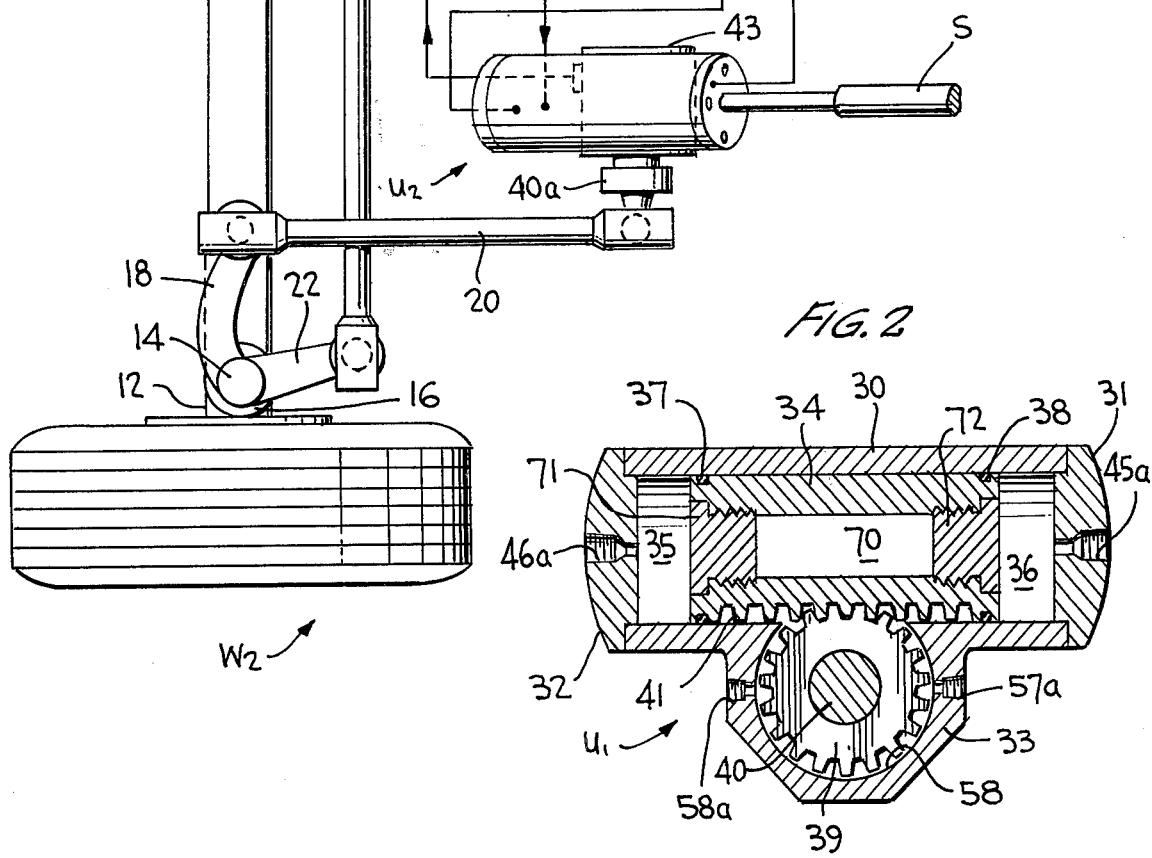
FIG. 2 is a cross-sectional view of the slave gear unit used with the fluid control system shown in FIG. 1.

The slave steering unit $U_1$ includes a housing 30 forming a cylinder with end closure plates 31, 32 and an off-set portion 33 formed integrally with the housing and a crank 33a extending therefrom (see FIG. 2). Within the cylinder housing 30 is a reciprocating piston 34 forming alternate power and exhaust chambers 35, 36 at opposite ends thereof. Conventional sealing rings 37, 38 may be provided at the ends of the piston to seal the chambers. As can be seen in FIG. 2, the off-set portion 33 encloses the output gear 39 and the output shaft 40 to which the crank 33a (shown in FIG. 1) is attached. The piston includes a rack 41 meshing with the gear 39 to effect translating of the power from the reciprocating piston 34 to the output gear 39.

The slave gear unit $U_1$ is alternately fed pressurized fluid and exhausted by single transfer hoses 45, 46 connected to the end plates 31, 32 at tapped openings 45a, 46a, respectively. With this arrangement, no supplemental hoses to the respective chambers are needed to exhaust the fluid and return it to the intake or sump of the pump. This minimizes the cost of manufacture and also importantly minimizes the possibility of failure of mechanical parts, and thus the maintenance requirements are kept as low as possible.

The slave unit $U_1$ could, if desired, be controlled by a separate control system. Such a system would utilize a separate pump, control valve and transfer lines. Typically, the control valve would be mounted piggy-back (not shown) on the steering shaft S. However, in order to simplify the description, the preferred embodiment shown is of the single control circuit design. There is only one pump means, generally designated by the reference numeral 53. This includes a drive shaft 54 rotated by a belt and pulley from the engine of the vehicle (not shown) and a feed line 55 running to the master unit $U_2$. A sump or intake reservoir 56 is provided to receive the supply of fluid returning from the gear units $U_1$, $U_2$, as will be explained in further detail later.

The master steering gear unit $U_2$ is or may be considered essentially like the unit shown in my previous patents, Sheppard U.S. Pat. Nos. 3,092,083 or 3,566,751. In this type of unit, the control valve is mounted within the piston (not shown in this application) and the inlet line 55 feeds into the unit on the top (as shown in the drawing) and is then distributed to the internal control valve. Depending upon the rotation of the steering shaft S, the control valve is shifted to provide the pressure fluid from the line 55 to one side or the other of the piston within the unit. The side of the piston not receiving the pressurized fluid is exhausted at the same time by the valve. The exhaust or discharge from the soft side of the piston is fed into the space or chamber in off-set portion 43, that is like the off-set portion 33 of the slave unit $U_1$, shown in FIG. 2. Because the exhaust pressure is essentially low-pressure fluid, the output shaft supporting the crank 40a may also be sealed only with a low pressure seal. From the space within the off-set portion 43, the low pressure fluid is fed into discharge or exhaust line 57.

In accordance with the present invention, the discharge line 57 is connected to space 58 within the off-set portion 33 through a suitable inlet orifice 57a (see FIG. 2). The fluid flows around the output pinion 39 and is then emptied through fluid return line 58 connected through the orifice 58a on the opposite side.

As shown in FIG. 1, the return line is connected to the intake or sump 56 of the pump 53.

The advantages of providing a control system of the present invention should now be apparent. First, the low pressure fluid flowing through discharge line 57 sweeps through the transfer space 58 and picks up by entrainment any high pressure fluid that has escaped around the sealing rings 37, 38 preventing any build-up of pressure.

Secondly, this fluid has been originally heated in the pump 53 and in the master unit $U_2$. The residual heat in the fluid is advantageously then available to warm the slave unit $U_1$ by heat transfer. Note that the fluid not only contacts the housing portion 43 forming space 58, but also travels around the output gear 39 and up in contact with the reciprocating piston 34 so that a subsantial surface area is contacted. Through the metal of these parts of the slave gear $U_1$, the heat is absorbed and the unit quickly, after start up, reaches a temperature substantially the same as the master unit $U_2$.

It should be noted at this point that without this positive circulation of fluid through the slave unit, little direct heat transfer to the unit is possible. The single transfer lines 45, 46 from the drive chambers of the master unit $U_2$ do not allow any significant amount of heat transfer. This is so since the fluid trapped in these lines works as a solid reciprocating mechanical part with a relatively low heat transfer coefficient. The fluid adjacent the slave unit $U_1$ is essentially trapped and isolated from the warmer fluid that is flowing through the work chambers of the master unit $U_2$. But for the circulation of the exhaust fluid through line 57 into the transfer space 58 a substantial temperature gradient between the units would exist. With the present invention, the slave unit $U_1$ and the master unit $U_2$ are maintained at essentially the same temperature. Or to put it another way, the temperature gradient between the two is minimized.

In warm weather and under severe steering conditions, the heat radiated from the housing of the slave unit $U_1$ helps keep the system operating at a reasonably low temperature. In cold weather, the slave unit is quickly heated to operating temperature eliminating cold "slugs" of hydraulic fluid from the system that can disrupt the synchronization of the units, cause annoying noises or even harm the pump.

Another distinct advantage of providing the flow of low pressure fluid through the transfer space 58 of the slave unit $U_1$ is that any trapped air bubbles or foam is immediately purged from the system and fed back to the sump or intake reservoir 56 where the bubbles can escape. This is particularly important where maintenance has required opening the fluid circuit. Any amount of air can be removed within a short time after start-up.

The slave unit $U_1$, shown in FIG. 2, is preferably made with the reciprocating piston 34 having an internal chamber 70. This is of importance when the part is being originally hardened. Also, it is clear that this same piston 34 can be machined on the same tape controlled machine tool as the piston of the pressure unit $U_2$, thus saving on the manufacturing cost. Solid plugs 71, 72 close off the end of the interior 70 and complete the formation of the piston 34.

In summarizing the present invention, the exhaust fluid from the master steering unit $U_2$ is circulated through the slave unit $U_1$ to accomplish several advantageous results. The build-up of pressure around the output pinion or gear 39 is prevented. Thus, only low pressure seal 60 is required for the output shaft 40. Secondly, the temperature gradient between the two units $U_1$, $U_2$ is minimized. During hot seasons and under heavy working conditions the slave unit $U_1$ serves as a heat sink to dissipate heat by radiation, and thus maintains the system at a normal working temperature. In colder climates, the transfer of heat is important to quickly bring the slave unit $U_1$ up to operating temperature, thus gaining a more efficient operation. Slugs of cold fluid that might otherwise cause problems are eliminated by circulation of the heated fluid through the slave unit $U_1$. Thirdly, any trapped air bubbles or foam within the slave unit $U_1$ that would otherwise be trapped are purged.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A fluid control circuit for a power steering system having at least two power units with reciprocating pistons each in a cylinder with opposed working chambers comprising:

pump means for supplying a flow of pressurized fluid to said units, discharge means connected to at least one of the units to receive the flow of fluid including the fluid from the chamber on the exhaust side of the piston, a transfer space in the other unit separate from the chambers connected to said discharge means of said one unit to receive the flow of low pressure exhaust fluid, and fluid return means to receive said flow of fluid connecting said transfer space with the intake side of said pump means, whereby the temperature gradient between said units is minimized and build-up of pressure in said other unit is prevented.

2. The apparatus of claim 1 wherein said steering units are integral master and slave power steering gear units including output pinions, with low pressure spaces enclosing the output pinions, the discharge means of said master unit including its low pressure space, and the transfer space of said slave unit including its low pressure space.

3. The apparatus of claim 2 wherein said slave unit includes a housing forming power chambers at opposite ends of the piston, the low pressure transfer space being separated and sealed from the chambers by the ends of the pistons, and single fluid transfer means for each of said chambers to allow alternate introduction of higher pressure working fluid to one of said chambers to power the piston and concurrent exhausting of the other chamber, whereby to minimize the flow of high pressure fluid.

4. The apparatus of claim 3 wherein said piston is hollow, the ends of said piston being sealed by solid plugs to prevent direct flow of fluid between said chambers and said low pressure transfer space.

5. The apparatus of claim 3 wherein said single fluid transfer means are connected directly to the respective power chambers at the ends of said master unit.

6. The apparatus of claim 1 wherein said one unit is a master unit and said other unit is a slave unit.

* * * * *